United States Patent
Evans et al.

(10) Patent No.: US 6,907,978 B2
(45) Date of Patent: Jun. 21, 2005

(54) METHODS AND APPARATUSES FOR INDUCTING ARTICLES ONTO A CONVEYOR

(75) Inventors: Richard T. Evans, Endicott, NY (US); Mark Gallagher, Endicott, NY (US); Kenneth Gluck, Vestal, NY (US); Eugene Stradley, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 45 days.

(21) Appl. No.: 10/701,823

(22) Filed: Nov. 5, 2003

(65) Prior Publication Data

US 2005/0077145 A1 Apr. 14, 2005

Related U.S. Application Data

(60) Provisional application No. 60/510,050, filed on Oct. 9, 2003.

(51) Int. Cl.$^7$ ............................................. B65G 47/10
(52) U.S. Cl. ................................. 198/370.09; 198/809
(58) Field of Search ...................... 198/370.01, 370.09, 198/809

(56) References Cited

U.S. PATENT DOCUMENTS

| | | | |
|---|---|---|---|
| 3,456,773 A | * 7/1969 | Titmas, Jr. | ............. 198/370.09 |
| 3,680,677 A | * 8/1972 | Branch et al. | ........... 198/369.6 |
| 4,180,150 A | 12/1979 | Moore | |
| 4,746,003 A | 5/1988 | Yu et al. | |
| 4,915,209 A | 4/1990 | Canziani | |
| 4,962,841 A | * 10/1990 | Kloosterhouse | ........ 198/370.09 |
| 5,165,516 A | * 11/1992 | Reed et al. | .............. 198/370.1 |
| 5,551,543 A | 9/1996 | Mattingly et al. | |
| 5,634,562 A | 6/1997 | Isaacs | |
| 5,868,238 A | * 2/1999 | Bonnet | .................... 198/370.1 |
| 5,887,699 A | 3/1999 | Tharpe | |
| 5,971,133 A | 10/1999 | Wilkins | |
| 6,015,039 A | * 1/2000 | Bonnet | ....................... 198/368 |
| 6,073,747 A | 6/2000 | Takino et al. | |
| 6,116,405 A | 9/2000 | Gauchon | |
| 6,343,685 B1 | * 2/2002 | Hofer | ..................... 198/370.09 |
| 6,370,447 B1 | * 4/2002 | Miyazaki | .................... 700/230 |
| 6,382,393 B2 | * 5/2002 | Itoh et al. | .............. 198/370.09 |
| 6,464,064 B1 | * 10/2002 | Rieg et al. | ............. 198/370.09 |
| 6,513,641 B1 | 2/2003 | Affaticati et al. | |
| 6,581,749 B2 | * 6/2003 | Wood et al. | ........... 198/370.09 |
| 6,595,349 B2 | * 7/2003 | MacSwan | .................... 198/607 |
| 6,662,926 B1 | * 12/2003 | Wood et al. | .............. 198/370.1 |

* cited by examiner

Primary Examiner—Richard Ridley
(74) Attorney, Agent, or Firm—Wolf, Greenfield & Sacks, P.C.

(57) ABSTRACT

An novel apparatus and technique may be used to induct articles onto a conveyor comprising at least one conveyor belt that moves articles along a first path that extends in a first direction. The apparatus may be used to move an article along a second path that extends in a second direction, which is transverse to the first direction, to a first position above but not in contact with the at least one conveyor belt. After the article has been moved to the first position above but not in contact with the at least one conveyor belt, the apparatus may be used to move the article onto the at least one conveyor belt.

72 Claims, 4 Drawing Sheets

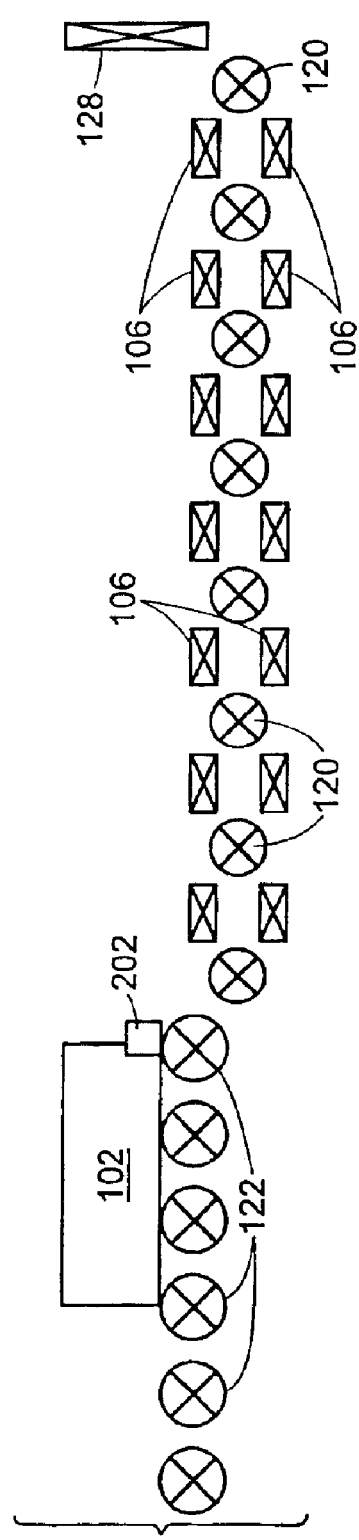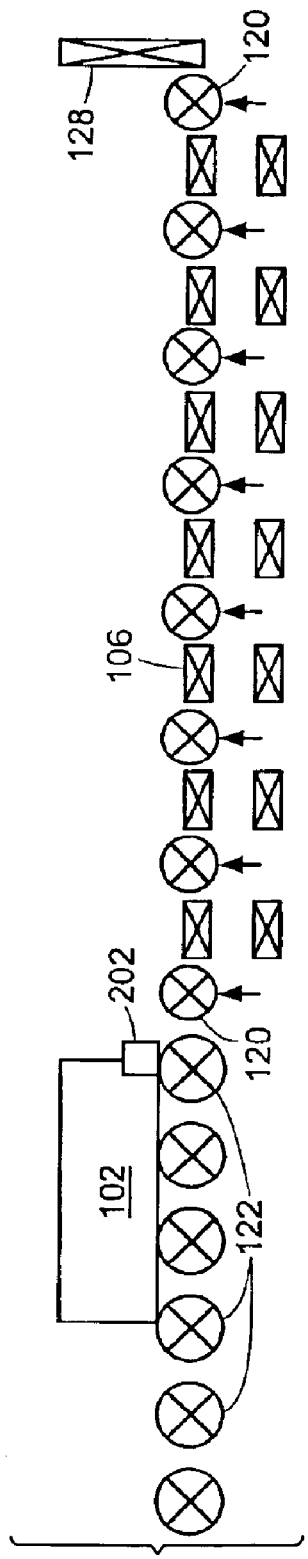

METHODS AND APPARATUSES FOR INDUCTING ARTICLES ONTO A CONVEYOR

CROSS-REFERENCE TO RELATED APPLICATION(S)

This application claims the benefit of U.S. Provisional Application Ser. No. 60/510,050, entitled METHODS AND APPARATUSES FOR INDUCTING ARTICLES ONTO A CONVEYOR, filed on Oct. 9, 2003, which is incorporated herein by reference in its entirety.

The present invention is directed to novel methods and apparatuses for inducting articles onto a conveyor.

BACKGROUND

Conveyors are used in a number of applications, including the singulation, separation (gapping), and sortation of products, packages, luggage, etc. (hereafter "articles"). Such conveyors typically employ either a number of parallel rollers arranged perpendicular to the conveyor's flow direction, or one or more continuous belts that carry articles in the flow direction. In some belt conveyors, each section of the conveyor employs only a single, wide belt for transporting articles . In others, called "narrow belt" conveyors, a plurality of relatively narrow belts are arranged parallel to one another in each section, such that each article may, and generally will, be simultaneously carried by multiple belts.

It is, of course, necessary to somehow introduce, or "induct," articles onto a conveyor, and a number of techniques for accomplishing that objective have been disclosed in the prior art. Most commonly in these prior art systems, articles are inducted onto the end of the conveyor, or are inducted at approximately a forty-five degree angle with respect to the flow path of the conveyor, and are accelerated to the speed of the flow path prior to induction. Disclosed herein are novel apparatuses and methods for inducting articles onto a conveyor that differ significantly from, and constitute marked improvements over, prior art article induction systems and methods.

SUMMARY OF THE INVENTION

According to one aspect of the present invention, a method is disclosed for using an apparatus to induct articles onto a conveyor comprising at least one conveyor belt that moves articles along a first path that extends in a first direction. According to the method, the apparatus is used to move a first article along a second path that extends in a second direction, which is transverse to the first direction, to a first position above but not in contact with the at least one conveyor belt. After the first article has been moved to the first position above but not in contact with the at least one conveyor belt, the apparatus is used to move the first article onto the at least one conveyor belt.

According to another aspect of the invention, a method is disclosed for using an apparatus to induct articles onto at least one conveyor belt that moves articles along a first path extending in a first direction at least between first and second points. According to this method, the apparatus is used to move a first article along a second path that extends in a second direction, which is substantially perpendicular to the first direction, so that the first article is positioned adjacent the first path at a first location between the first and second points. After the first article has been positioned adjacent the first path at the first location, the apparatus is used to move the first article onto the at least one conveyor belt.

According to another aspect of the invention, a method is disclosed for using an apparatus to induct articles onto a conveyor that moves inducted articles along a first path extending in a first direction at least between first and second points. According to this method, the apparatus is used to move a first article along a second path that extends in a second direction, which is substantially perpendicular to the first direction, so that the first article is positioned adjacent the first path at a first location between the first and second points. After the first article has been positioned adjacent the first path at the first location, the apparatus is used to move the first article onto the conveyor. In addition, the conveyor is operated such that inducted articles are moved along the first path at a speed of at least one hundred and eighty feet per minute.

According to another aspect of the invention, a method is disclosed for using an apparatus to induct articles onto a conveyor that moves inducted articles along a first path extending in a first direction at least between first and second points. According to this method, the apparatus is used to move a first article along a second path that extends in a second direction, which is substantially perpendicular to the first direction, so that the first article is positioned adjacent the first path at a first location between the first and second points. After the first article has been positioned adjacent the first path at the first location, the apparatus is used to move the first article onto the conveyor. In addition, the conveyor is operated such that articles pass at least one point along the first path at a rate greater than thirty articles per minute.

According to another aspect of the invention, a method is disclosed for using an apparatus to induct articles onto a belt conveyor comprising at least two parallel belts that carry the articles along a first path extending in a first direction. According to this method, the apparatus is used to move a first article along a second path that extends in a second direction, which is transverse to the first direction, so that the first article is positioned adjacent the first path at a first location. After the first article has been positioned adjacent the first path at the first location, the apparatus is used to move the first article onto the belt conveyor.

According to yet another aspect of the invention, an apparatus comprises at least one conveyor belt, and a conveyor system. The at least one conveyor belt is configured and arranged to carry articles along a first path that extends in a first direction. The conveyor system is configured and arranged to move first articles along a second path that extends in a second direction, which is transverse to the first direction, to a first position above but not in contact with the at least one conveyor belt. The first conveyor system is further configured and arranged to move the first articles onto the at least one conveyor bell after the first articles has been moved to the first position above but not in contact with the at least one conveyor belt.

According to another aspect of the invention, an apparatus comprises at least one conveyor belt, and a conveyor system. The at least one conveyor belt moves articles along a first path extending in a first direction at least between first and second points. The conveyor system is configured and arranged to move first articles along a second path that extends in a second direction, which is substantially perpendicular to the first direction, so that the first articles are positioned adjacent the first path at a first location between the first and second points. The first conveyor system is further configured and arranged to move the first articles onto the at least one conveyor belt after the first articles have been positioned adjacent the first path at the first location.

According to another aspect of the invention, an apparatus comprises a conveyor and a conveyor system. The conveyor is configured and arranged to move inducted articles along a first path extending in a first direction at least between first and second points at a speed of at least one hundred and eighty feet per minute. The conveyor system is configured and arranged to move first articles along a second path that extends in a second direction, which is substantially perpendicular to the first direction, so that the first articles are positioned adjacent the first path at a first location between the first and second points. The conveyor system is further configured and arranged to move the first articles onto the conveyor after the first articles have been positioned adjacent the first path at the first location.

According to another aspect of the invention, an apparatus comprises a conveyor and a conveyor system. The conveyor is configured and arranged to move inducted articles along a first path extending in a first direction at least between first and second points such that articles pass at least one point along the first path at a rate greater than thirty articles per minute. The conveyor system is configured and arranged to move first articles along a second path that extends in a second direction, which is substantially perpendicular to the s first direction, so that the first articles are positioned adjacent the first path at a first location between the first and second points. The conveyor system is further configured and arranged to move the first articles onto the conveyor after the first articles have been positioned adjacent the first path at the first location.

According to another aspect of the invention, an apparatus comprises a belt conveyor and a conveyor system. The belt conveyor comprises at least two parallel belts that carry articles along a first path extending in a first direction at least between first and second points. The conveyor system is configured and arranged to move first articles along a second path that extends in a second direction, which is transverse to the first direction, so that the first articles are positioned adjacent the first path at a first location between the first and second points. The conveyor system is further configured and arranged to move the first articles onto the belt conveyor after the first articles have been positioned adjacent the first path at the first location.

According to another aspect of the invention, an apparatus comprises means for carrying articles along a path, and means for inducting first articles onto the means for carrying by moving the first articles to a first position above but not in contact with the means for carrying and then moving the first articles onto the means for carrying.

BRIEF DESCRIPTION OF THE DRAWINGS

FIGS. 2a–2d are cross-sectional side views of the apparatus FIG. 1, which illustrate how an article may be inducted onto a conveyor in accordance with various aspects of the invention.

DETAILED DESCRIPTION OF THE INVENTION

Figure 1:
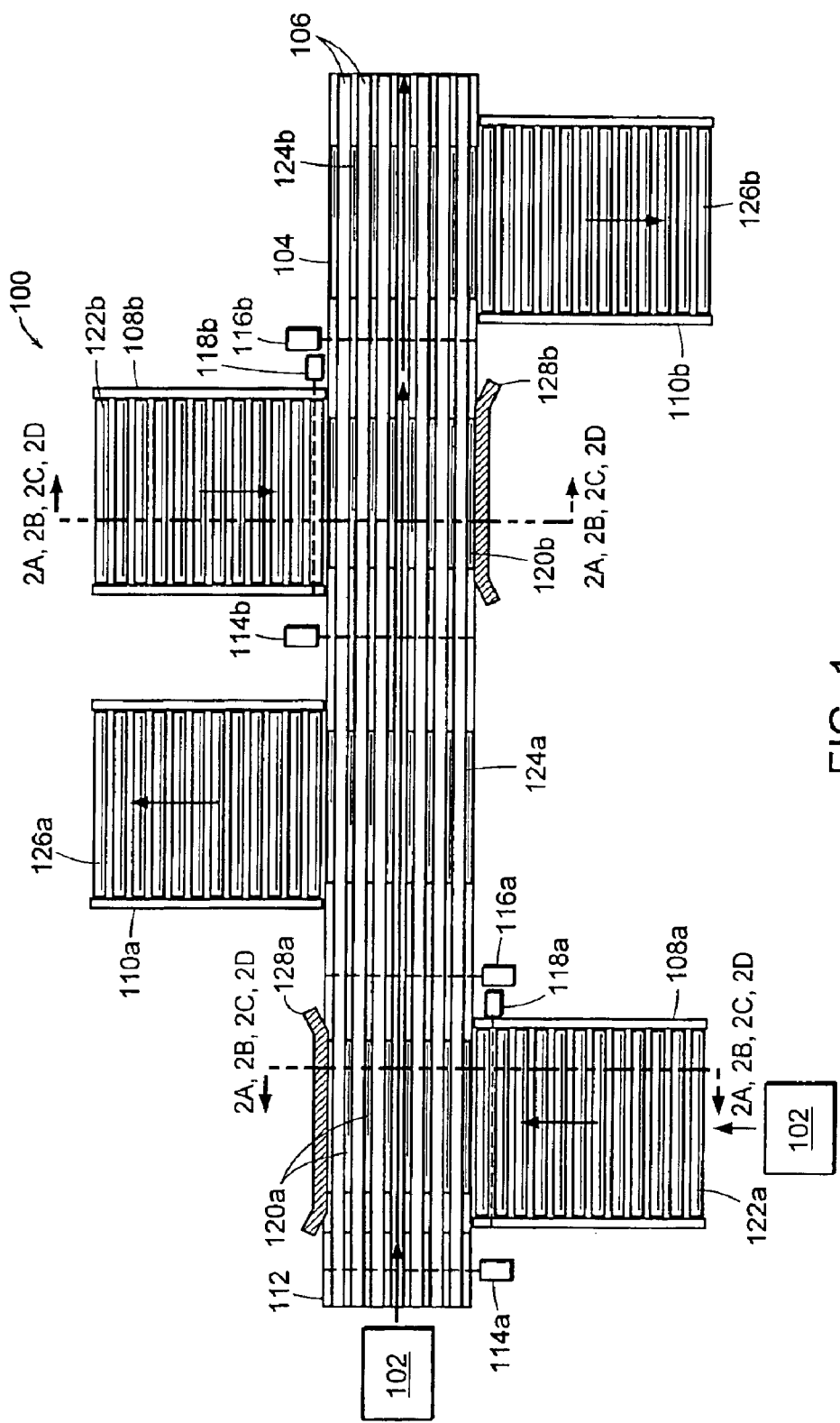
FIG. 1 is a top view of an apparatus that embodies several aspects of the present invention.

FIG. 1 shows a top view of an apparatus 100 embodying several aspects of the present invention. As shown, the apparatus 100 includes a conveyor 104 that is configured and arranged to convey one or more articles 102 along a path defined by the conveyor. In the example shown, the conveyor 104 includes a plurality of continuous belts 106 (seven belts in the example shown) configured and arranged to move the articles 102 from the left to the right in FIG. 1. A conveyor having a belt arrangement like that shown in FIG. 1 is commonly referred to as a "narrow belt sorter."

In addition to the conveyor 104, the apparatus 100 includes a pair of linear sorter divert modules 110a–b. The modules 110a–b include pop-up rollers 124a–b that pop-up between the belts 106 so as to lift articles 102 up off of the belts 106 and roll the articles 102 onto standard twenty four volt direct current (DC) live roller conveyors, each including a plurality of rollers 126a–b. The pop-up rollers 124 and conveyor rollers 126 thereby divert articles off of and away from the conveyor 104.

In addition to the divert modules 110, the example apparatus 100 includes a pair of induction modules 108 that are configured and arranged much like the divert modules 110, but that are operated in reverse so as to induct articles onto to the conveyor 104 rather than to divert articles therefrom. In particular, like the divert modules 110, the induction modules 108a–b comprise twenty four volt DC live roller conveyors including a plurality of rollers 122a–b, as well as a set of pop-up rollers 120a–b that are configured and arranged to pop-up between the belts 106. In the induction modules 108, however, the pop-up rollers 120 and conveyor rollers 122 are operated so as to pull articles 102 in the direction indicated by the arrows shown in FIG. 1, i.e., from the rollers 122 onto the conveyor 104.

The roller conveyors of the induction modules 108 and divert modules 110 may each, for example, be thirty inches wide, and may be arranged so as to be substantially level with a plane formed by the upper surfaces of the belts 106 of the conveyor 104. It should be appreciated, however, that the invention is not so limited, and that the modules 108 and 110 may be of different configurations and sizes, and arranged in different ways, in different embodiments of the invention. The number of and relative positions of induction modules 108 and/or divert modules 110 may, of course, be tailored to the incoming product stream volume and desired characteristics of the system. That is, in alternative embodiments, additional or fewer induction modules 108 and/or divert modules 110 may be employed, and such induction modules 10 and/or divert modules 110 may be arranged in any of numerous locations along the conveyor 104 and may be positioned relative to other induction modules 108 and/or divert modules 10 in any of numerous ways. The number and placement of such modules is effectively limited only by the size and configuration of the apparatus 100.

As shown in FIG. 1, each of the induction modules 108 may have a back stop 108a–b associated with it, so as to prevent inducted articles from overshooting the conveyor 104 when they are dynamically merged onto it. In addition, as also shown in FIG. 1, each of the induction modules 108 may have a set of sensors associated with it so as to permit one or more controllers (not shown) to exercise control over when and how articles are inducted onto the conveyor 104. For example, in some embodiments, a controller may receive inputs from various sensors so as to induct an article onto the conveyor 104 only when there exists sufficient room between successive articles already on the conveyor, and perhaps to insure that sufficient gaping is maintained between the inducted article and each of the articles between which the inducted article is inducted.

In the illustrative embodiment of FIG. 1, the induction modules 108a–b have associated therewith a first sensor 114*a–b* upstream of an induction point, a second sensor 116*a–b* downstream of the induction point, and a third sensor 118*a–b* at or near the end of the roller conveyor of the induction module 108. An Example of a software routine that may be executed by one or more controllers that receive signals from the sensors 114, 116, 118 is described below in connection with FIG. 3.

In the illustrative embodiment shown, each of the sensors 114, 116, 118 comprises a photoeye which looks across an upper surface of the belts 106 in a direction substantially perpendicular thereto. In this manner, the sensors 114, 116, 118 output a signal that indicates whether an article 102 is present at a particular location along the length of the conveyor 104, or at or near the end of one of the roller conveyors of the induction modules 108.

FIGS. 2*a–d* illustrate a cross-section of relevant portions of the apparatus 100 taken along one of the lines indicated in FIG. 1. The blocks 202 in FIGS. 2*a–d* are intended to represent a cross-section of the view path of one of the sensors 118.

As shown, the portions of the apparatus 100 illustrated in cross-section include the rollers 122 included in the roller conveyor portion of an induction module 108, the continuous belts 106, the pop-up rollers 120 configured and arranged to pop-up between the continuous belts 106, and the backstop 128.

Figure 2C:
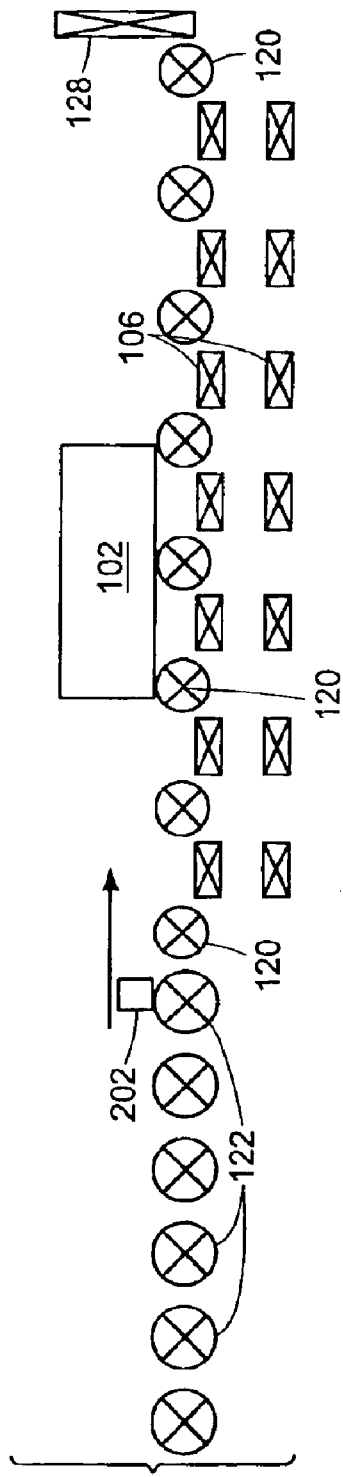

As shown in FIG. 2*a*, an article 102 may first be moved by the rollers 122 until it intercepts the beam 202 from a sensor 118. After intercepting the beam 202, the rollers 122 may be stopped so as to cause the article 102 to wait in the position shown until one or more controllers responsive to the sensors 114, 116 (not shown in FIGS. 2*a–d*) indicate that sufficient room exists between successive articles on the conveyor 104 to induct the article 102 therebetween. While the article 102 is waiting to be inducted, the pop-up rollers 120 are disposed underneath a plane formed by the upper surfaces of the belts 106.

FIG. 2*b* shows how, after one or more controllers have determined that sufficient room exists between successive articles on the conveyor 104 to induct the article 102 therebetween, the pop-up rollers 120 may be raised to a position just above the plane formed by the upper surfaces of the belts 106.

As shown in FIG. 2*c*, after the pop-up rollers 120 have been raised, the rollers 122 and pop-up rollers 120 may then both be operated so as to cause the package 102 to move to a position above, but not in contact with, the conveyor belts 106. In some embodiments, the rollers 120 may be operated for approximately one tenth of a second after the article 102 has cleared the path 202 of the photoeye 118.

Figure 2D:
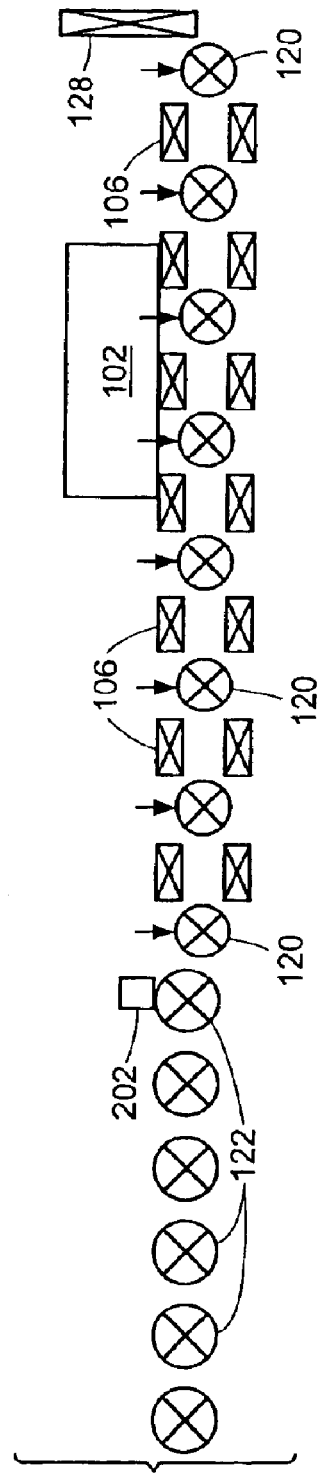

FIG. 2*d* illustrates how the rollers 120 may next be lowered from the position shown in FIG. 2*c* to a position below the plane formed by the upper surfaces of the belts 106, so as to dispose the article 102 onto the belts 106.

Following the step illustrated in FIG. 2*d*, the article 102 may be carried downstream by the belts 106 of the conveyor 104 where it may, for example, be diverted by a diversion module 110, or otherwise processed by downstream systems. In one illustrative embodiment, it takes approximately one-half of a second to move an article from the position shown in FIG. 2*a* to the position shown in FIG. 2*d*.

Figure 3:
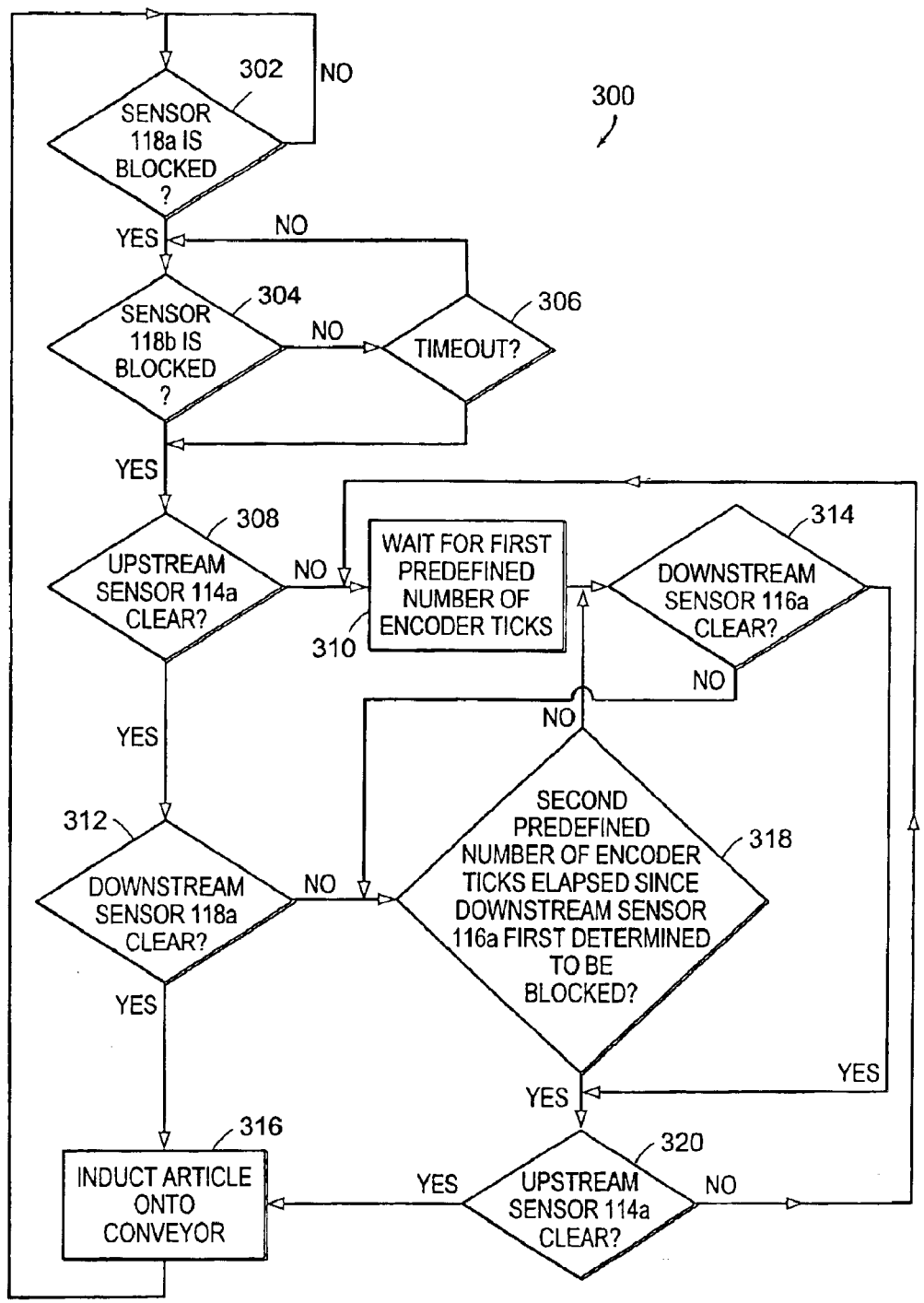
FIG. 3 is a flow chart showing an example of a routine that may be executed by one or more controllers to control the induction of articles onto the conveyor system of FIG. 1.

FIG. 3 is a flow chart showing an example of a routine that may be executed by one or more controllers (not shown) to control the induction of articles onto the conveyor system of FIG. 1. The controller(s) may receive signals from the sensors 114, 116 and 118, and, in response thereto, control times at which articles 102 are inducted onto the conveyor 104 by selectively operating the pop-up rollers 120 and conveyor rollers 122. In particular, by monitoring the outputs of the sensors 114, 116, 118, the controller(s) can ensure that sufficient space exists between successive articles on the conveyor 104 at least so that the inducted article 102 will fit therebetween, and perhaps so that at least a minimum gap will be present in most circumstances between the inducted article 102 and the articles between which the inducted article is to be inducted.

The example routine 300 of FIG. 3 may be used to control the induction module 108*a* of FIG. 1 to selectively induct articles 102 onto the conveyor 104. As discussed below, similar routines may also be used to control the induction module 108*b* and any other induction modules 108 (not shown) that are included in the system 100.

As shown in FIG. 3, the routine 300 begins at a step 302, wherein it waits until the sensor 118*a* at the end of the induction module 108*a* becomes blocked. As discussed above, when a sensor 118 is blocked, is known that an article 102 is waiting to be inducted onto the conveyor 104.

In some embodiments, the controller(s) may concurrently monitor the outputs of sensors 114, 116, 118 for multiple induction points, so that, when multiple articles are simultaneously waiting to be inducted on respective induction modules 108, those induction modules 108 may be operated simultaneously so as to induct those articles 102 onto the conveyor 104 at the same time. Such a feature may be useful, for example, when induction points are adjacent one another along the length of the conveyor 104, thereby possibly causing multiple articles to be inducted simultaneously with a known spacing between them.

Although the induction modules 108*a–b* are not directly adjacent one another in the example embodiment of FIG. 1 (i.e., the divert module 110*a* is between them), the routine of FIG. 3 illustrates how the above-described technique may be employed for the two induction modules 108*a–b* that are illustrated. That is, in the example routine 300, after it is determined (at the step 302) that the sensor 118*a* has become blocked, the routine 300 proceeds to steps 304 and 306, wherein it is also determined whether the sensor 118*b* of the induction module 108*b* is blocked or has become blocked within a predetermined timeout period. Thus, the routine 300 operates to control the induction module 108*a* so that articles 102 may be inducted simultaneously from the induction modules 108*a–b* onto the conveyor 104 when it is possible to do so without waiting too long. It should be appreciated that the induction module 108*b*, as well as each additional induction module included in the system, may concurrently be controlled using a similar routine, so that each may also attempt to induct articles 102 onto the conveyor 104 simultaneously with the other induction modules 108 when they can do so without waiting too long.

Of course, it should be appreciated that this feature is optional and, alternatively, each induction module 108 may be controlled based only upon the sensors 114, 116, 118 associated with that module. Thus, for such embodiments, the steps 304 and 306 may be skipped altogether, and the routine 300 may be proceed directly from the step 302 to the step 308 after it is determined (at the step 302) that the sensor 118*a* has become blocked.

In the example routine of FIG. 3, if it is determined at the steps 304 and 306 that the sensor 108*b* is blocked or has not become blocked within the preset period of time, the routine 300 proceeds to a step 308, wherein it is determined whether the upstream sensor 114*a* is clear.

When, at the step 308, it is determined that the upstream sensor 114a is clear, it is known that there is not presently an article upstream of the induction point that will inhibit the induction of a new article 102 from the induction module 108a onto the conveyor 104. Thus, in that circumstance, the routine 300 proceeds to a step 312, wherein the output of the downstream sensor 116a is checked.

When, at the step 312, it is determined that the downstream sensor 116a is also clear, the routine 300 proceeds immediately to a step 316, wherein the article 102 is inducted onto the conveyor, for example, by operating the rollers 122a and the pop-up rollers 120a of the induction module 108a. To ensure proper spacing between the inducted article and any article that may happen to be located immediately downstream of the sensor 116a, the downstream sensor 116a may be separated from the induction point by a distance that is slightly less than a minimum desired distance between articles on the conveyor. The difference between the spacing of the downstream sensor 116a from the induction point and the desired minimum distance between articles may, for example, take into account the amount of time required to induct an article 102 onto the conveyor 104 using the pop-up rollers 120. When this is done, even if an article were located immediately downstream of the sensor 116a, a new article would be inducted so as to be have exactly the desired minimum spacing between it and the downstream article, despite the delay incurred during the induction process.

As shown in FIG. 3, when, at the step 308, it is determined that the sensor 114a is not clear, it is known that an article is present upstream of the induction point, and the routine 308 must wait for that article to pass by before inducting a new article 102 onto the conveyor 104. One way of ensuring that the upstream article has completely cleared the induction point is to hold off on inducting a new article at least long enough to ensure that the article that was blocking the sensor 114a will have at least reached the downstream sensor 116a. Thereafter, the output of the downstream sensor 116a may be relied upon to article has sufficiently cleared the induction point.

The example routine shown achieves the foregoing objective by proceeding to a step 310, wherein the routine 300 waits a first predefined number of "encoder tick," before proceeding to steps 314 and 318 (wherein the output of the downstream sensor 116a is checked). Encoder ticks may be generated, for example, in response to the rotation of a wheel used to operate the belts 106. The rate at which encoder ticks occur, and the duration of each encoder tick, may therefore depend upon the speed at which the belts 106 are moving, with each "tick" representing about one to two inches of belt movement. In some embodiments, the routine 300 waits at the step 310 for exactly the number of encoder ticks corresponding to the distance between the upstream sensor 114a and the downstream sensor 116a. The routine 300 may, for example, wait at the step 310 for fifteen encoder ticks to occur before proceeding to the steps 314 and 318, with fifteen encoder ticks corresponding to the distance between the sensors 114a and 116a.

After completing the step 310, the routine 310 proceeds to the steps 314 and 318, wherein it is determined whether the downstream sensor 116a is or has become clear (step 314) or whether a second predefined number of encoder ticks (which may be the same as or different than the first predefined number of encoder ticks referenced in the step 310) have occurred (step 318).

As noted above, the downstream sensor 116a may be disposed at an appropriate distance downstream of the induction point such that, when it is determined at the step 314 that the downstream sensor 116a has become clear, an article 102 may be inducted at exactly the desired distance behind the article that was blocking the sensor 116a before the article 102 was inducted. Again, this may be accomplished by setting the distance between the downstream sensor 116a and the induction point to take into account the inherent delay of using the rollers 122a and pop-up rollers 120a to induct articles onto the conveyor 104.

In addition, for at least some applications, it may be assumed that, as a general matter, no article introduced onto the conveyor 104 will exceed a certain maximum length. So long as that assumption holds true, if the second number of encoder ticks referenced in the step 318 is selected so as to correspond to a distance along the conveyor 104 that is slightly less than the assumed maximum length of articles thereon, then the condition of one of the steps 314 and 318 will always be met, at the latest, just prior to when the article blocking the downstream sensor 116a moves out of that sensor's view. Thus, proper gapping between the inducted article and the article that was blocking the sensor 116a before the inducted article was inducted may be maintained in most circumstances.

When, however, an over-length article happens to be blocking the downstream sensor 116a when the routine 300 reaches the steps 314 and 318, the condition of the step 318 may be met, and an article may therefore be caused to be inducted, some appreciable time before the over-length article has actually cleared the sensor 116a. Thus, while this situation will result in the induction of an article with less than the ideal gap between it and the article it follows, it is at the same time ensured that a desired throughput will he maintained for the conveyor 104.

In any event, in the example shown, after either of the steps 314 or 318 is reached, the routine 300 bounces back and forth between the two until one of their conditions has been met. When either condition has been met, the routine 300 proceeds to a step 320, wherein the upstream sensor 114a is again checked to determine whether it is clear.

When, at the step 320, it is determined that the upstream sensor 114a is clear, the routine 300 proceeds to the step 316 (described above), wherein an article is inducted from the induction unit 308a onto the conveyor 104.

When, at the step 320, it is determined that the upstream sensor 114a is not clear, the routine 300 returns to the step 310, wherein it again waits for the first predefined number of encoder ticks to elapse before proceeding to the steps 314 and 318 (discussed above).

As previously noted, when it is determined at the step 312 that the downstream sensor 116a is clear, the routine 300 proceeds directly to the step 316 wherein an article is immediately inducted onto the conveyor 104. When, however, it is determined at the step 312 that the downstream sensor 116a is not clear, the routine 300 proceeds instead to the steps 314 and 318 (discussed above).

It should be appreciated that, in alternative embodiments, the timeout period of the step 306 may be determined based upon a predefined number of encoder ticks or upon some other measure of delay, rather than a predefined period of time. Similarly, in either (or both) of the steps 310 and 318, the routine 300 may alternatively wait for a predefined time period to elapse or use some other means to measure a delay, instead of waiting for a predefined number encoder ticks to occur.

In some embodiments, the conveyor 104 may be operated to as to convey articles at a speed greater than one hundred and twenty feet per minute, or greater than one hundred and eighty feet per minute, or even up to and above two hundred and forty feet per minute. Additionally or alternatively, in some embodiments, the rollers 122 on the induction modules 108 may be operated to convey articles at a speed greater than three hundred feet per minute, or greater than four hundred and fifty feet per minute, or even up to and above six hundred feet per minute. At such speeds, a sufficient number of articles may be inducted onto the conveyor 104 so as to achieve a system throughput of greater than thirty articles per minute, or greater than forty five articles per minute, or even up to and above sixty articles per minute.

The described apparatus thus allows the high speed induction of items onto a narrow belt sorter by means of a live roller conveyor running perpendicular to the sorter. This allows for multiple input locations and thus provides operator efficiency. This design therefore provides the capability of multiple infeed conveyors, affording the advantage of redundant article input locations as compared to the single conveyor infeed method prevalent in the prior art. The use of multiple induction points in such a manner may therefore allow personnel who are feeding the sorter to each have his or her own induction station and thereby allow them to work without the possibility of physical interference with one another.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for using an apparatus to induct articles onto a conveyor comprising at least one conveyor belt that moves articles along a first path that extends in a first direction, the method comprising steps of:
   (a) using the apparatus to move a first article along a second path that extends in a second direction, which is transverse to the first direction, to a first position above but not in contact with the at least one conveyor belt;
   (b) after the first article has been moved to the first position above but not in contact with the at least one conveyor belt, using the apparatus to move the first article onto the at least one conveyor belt;
   (c) using the apparatus to move a second article along a third path that extends in a third direction, which is transverse to the first direction, to a second position above but not in contact with the at least one conveyor belt, the second position being upstream of the first position; and
   (d) after the second article has been moved to the second position above but not in contact with the at least one conveyor belt, using the apparatus to move the second article onto the at least one conveyor belt.

2. The method of claim 1, wherein the second direction is substantially perpendicular to the first direction.

3. The method of claim 1, wherein the at least one conveyor belt comprises at least two parallel belts that carry articles along the first path.

4. The method of claim 3, wherein:
   the step (a) further comprises using at least one roller disposed between the at least two parallel belts to move the first article to the first position above but not in contact with the at least two parallel belts; and
   the step (b) further comprises lowering the at least one roller below an upper plane formed by the at least two parallel belts so that the first article is moved onto the at least two parallel belts.

5. The method of claim 1, wherein the step (a) comprises using a plurality of rollers to move the first article to the first position above but not in contact with the at least one conveyor belt.

6. The method of claim 1, wherein:
   the step (a) comprises using a first plurality of rollers to move the first article to the first position above but not in contact with the at least one conveyor belt; and
   the step (c) comprises using a second plurality of rollers to move the second article to the second position above but not in contact with the at least one conveyor belt.

7. The method of claim 1, further comprising a step of:
   (e) moving the at least one conveyor belt such that inducted articles are moved along the first path at a speed of at least 180 feet per minute.

8. The method of claim 1, further comprising a step of:
   (e) moving the at least one conveyor belt such that articles pass at least one point along the first path at a rate greater than 30 articles per minute.

9. The method of claim 1, further comprising a step of:
   (e) moving the at least one conveyor belt such that articles pass at least one point along the first path at a rate of at least 60 articles per minute.

10. The method of claim 1, further comprising a step of:
    (e) using the apparatus to divert at least one article from the at least one conveyor belt at a location that is upstream of the first position.

11. The method of claim 1, wherein the apparatus further comprises at least one sensor and at least one controller, and wherein the method further comprises a step of:
    (e) using the at least one controller to monitor an output of the at least one sensor to determine whether sufficient room exists between successive articles on the at least one conveyor belt to induct the first article therebetween; and
    (f) performing the steps (a) and (b) in response to the at least one controller determining that sufficient room exists between successive articles on the at least one conveyor belt to induct the first article therebetween.

12. The method of claim 11, wherein the steps (e) and (f) are performed such that, at least for articles of less than a certain length, at least a minimum gap is maintained between the first article and each of the successive articles between which the first article is inducted.

13. The method of claim 1, further comprising a step of:
    (e) using the apparatus to induct at least one article onto the at least one conveyor belt at a location upstream of the second position.

14. A method for using an apparatus to induct articles onto at least one conveyor belt that moves articles along a first path extending in a first direction at least between first and second points, comprising steps of:
    (a) using the apparatus to move a first article along a second path that extends in a second direction, which is substantially perpendicular to the first direction, so that the first article is positioned adjacent the first path at a first location between the first and second points;
    (b) after the first article has been positioned adjacent the first path at the first location, using the apparatus to move the first article onto the at least one conveyor belt;
    (c) using the apparatus to move a second article along a third path that extends in a third direction, which is substantially perpendicular to the first direction, so that the second article is positioned adjacent the first path at a second location between the first and second points the second location being upstream of the first location; and (d) after the second article has been positioned adjacent the first path at the second location, using the apparatus to move the second article onto the at least one conveyor belt.

15. The method of claim 14, wherein the at least one conveyor belt comprises at least two parallel belts that carry articles along the first path.

16. The method of claim 15, wherein the step (b) comprises:

using at least one roller disposed between the at least two parallel belts to move the first article to a position above but not in contact with the at least two parallel belts; and lowering the at least one roller below an upper plane formed by the at least two parallel belts so that the first article is moved onto the at least two parallel belts.

17. The method of claim 14, wherein the step (a) comprises using a plurality of rollers to move the first article so that the first article is positioned adjacent the first path at the first location.

18. The method of claim 14, wherein:

the step (a) comprises using a first plurality of rollers to move the first article along the second path so that the first article is positioned adjacent the first path at the first location; and the step (c) comprises using a second plurality of rollers to move the second article along the third path so that the second article is positioned adjacent the first path at the second location.

19. The method of claim 14, further comprising a step of:

(e) moving the at least one conveyor belt such that inducted articles are moved along the first path at a speed of at least 180 feet per minute.

20. The method of claim 14, further comprising a step of:

(e) moving the at least one conveyor belt such that articles pass at least one point along the first path at a rate greater than 30 articles per minute.

21. The method of claim 14, further comprising a step of:

(e) moving the at least one conveyor belt such that articles pass at least one point along the first path at a rate of at least 60 articles per minute.

22. The method of claim 14, further comprising a step of:

(e) diverting at least one article from the at least one conveyor belt at a third location that is upstream of the first location.

23. The method of claim 14, wherein the apparatus comprises at least one sensor and at least one controller, and wherein the method further comprises a step of:

(e) using the at least one controller to monitor an output of the at least one sensor to determine whether sufficient room exists between successive articles on the at least one conveyor belt to induct the first article therebetween; and (f) performing the step (b) in response to the at least one controller determining that sufficient room exists between successive articles on the at least one conveyor belt to induct the first article therebetween.

24. The method of claim 23, wherein the steps (e) and (f) are performed such that, at least for articles of less than a certain length, at least a minimum gap is maintained between the first article and each of the successive articles between which the first article is inducted.

25. The method of claim 14, further comprising a step of:

(e) using the apparatus to induct at least one article onto the at least one conveyor belt at a third location that is upstream of the second location.

26. A method for using an apparatus to induct articles onto a belt conveyor comprising at least two parallel belts that carry the articles along a first path extending in a first direction, comprising steps of:

(a) using the apparatus to move a first article along a second path that extends in a second direction, which is transverse to the first direction, so that the first article is positioned adjacent the first path at a first location;

(b) after the first article has been positioned adjacent the first path at the first location, using the apparatus to move the first article onto the belt conveyor;

(c) using the apparatus to move a second article alone a third path that extends in a third direction, which is transverse to the first direction, so that the second article is positioned adjacent the first path at a second location, the second location being upstream of the first location; and (d) after the second article has been positioned adjacent the first path at the second location, using the apparatus to move the second article onto the belt conveyor.

27. The method of claim 26, wherein the step (b) comprises:

using at least one roller disposed between the at least two parallel belts to move the first article to a first position above but not in contact with the at least two parallel belts; and lowering the at least one roller below an upper plane formed by the at least two parallel belts so that the first article is moved onto the belt conveyor.

28. The method of claim 26, wherein the step (a) comprises using a plurality of rollers to move the first article along the second path so that the first article is positioned adjacent the first path at the first location.

29. The method of claim 26, wherein:

the step (a) comprises using a first plurality of rollers to move the first article along the second path so that the first article is positioned adjacent the first path at the first location; and the step (c) comprises using a second plurality of rollers to move the second article along the third path so that the second article is positioned adjacent the first path at the second location.

30. The method of claim 26, further comprising a step of:

(e) operating the belt conveyer such that inducted articles are moved along the first path at a speed of at least 180 feet per minute.

31. The method of claim 26, further comprising a step of:

(e) operating the belt conveyer such that articles pass at least one point along the first path at a rate greater than 30 articles per minute.

32. The method of claim 26, further comprising a step of:

(e) operating the belt conveyer such that articles pass at least one point along the first path at a rate of at least 60 articles per minute.

33. The method of claim 26, further comprising a step of:

(e) using the apparatus to divert at least one article from the belt conveyor at a third location that is upstream of the first location.

34. The method of claim 26, wherein the apparatus comprises at least one sensor and at least one controller, and wherein the method further comprises a step of:

(e) using the at least one controller to monitor an output of the at least one sensor to determine whether sufficient room exists between successive articles on the belt conveyor to induct the first article therebetween; and (f) performing the step (b) in response to the at least one controller determining that sufficient room exists between successive articles on the belt conveyor to induct the first article therebetween.

35. The method of claim 34, wherein the steps (e) and (f) are performed such that, at least for articles of less than a certain length, at least a minimum gap is maintained between the first article and each of the successive articles between which the first article is inducted.

36. The method of claim 26, further comprising a step of:
(c) using the apparatus to induct at least one article onto the belt conveyor at a third location that is upstream of the second location.

37. An apparatus, comprising:
at least one conveyor belt configured and arranged to carry articles along a first path that extends in a first direction;
a first conveyor system configured and arranged to move first articles along a second path that extends in a second direction, which is transverse to the first direction, to a first position above but not in contact with the at least one conveyor belt, the first conveyor system being further configured and arranged to move the first articles onto the at least one conveyor belt after the first articles have been moved to the first position above but not in contact with the at least one conveyor belt; and
a second conveyor system configured and arranged to move second articles to a second position above but not in contact with the at least one conveyor belt and to move the second articles onto the at least one conveyor belt after the second articles have been moved to the second position above but not in contact with the at least one conveyor belt, the second position being upstream of the first position.

38. The apparatus of claim 37, wherein the second direction is substantially perpendicular to the first direction.

39. The apparatus of claim 37, wherein the at least one conveyor belt comprises at least two parallel belts that carry articles along the path.

40. The apparatus of claim 39, wherein the first conveyor system comprises at least one roller disposed between the at least two parallel belts, the at least one roller being configured and arranged to move the first articles to the first position above the at least two parallel belts, and being further configured and arranged to be moved below an upper plane formed by the at least two parallel belts to thereby move the first articles onto the at least two parallel belts.

41. The apparatus of claim 37, wherein the first conveyor system comprises a plurality of rollers configured and arranged to move the first articles to the first position above the at least one conveyor belt.

42. The apparatus of claim 37, wherein:
the first conveyor system comprises a first plurality of rollers configured and arranged to move the first articles to the first position above the at least one conveyor belt; and
the second conveyor system comprises a second plurality of rollers configured and arranged to move the second articles to the second position above the at least one conveyor belt.

43. The apparatus of claim 37, wherein the at least one conveyor belt is configured and arranged to move articles along the first path at a speed of at least 180 feet per minute.

44. The apparatus of claim 37, wherein the at least one conveyor belt is configured and arranged to move articles along the first path such that articles are caused to pass at least one point along the first path at a rate greater than 30 articles per minute.

45. The apparatus of claim 37, wherein the at least one conveyor belt is configured and arranged to move articles along the first path such that articles are caused to pass at least one point along the first path at a rate of at least 60 articles per minute.

46. The apparatus of claim 37, further comprising:
a third conveyor system configured and arranged to divert articles from the at least one conveyor belt at a location upstream of the first position.

47. The apparatus of claim 37, wherein the apparatus further comprises at least one sensor and at least one controller, the at least one sensor being configured and arranged to monitor articles on the at least one conveyor belt, and the at least one controller being configured to monitor an output of the at least one sensor to determine whether sufficient room exists between successive articles on the at least one conveyor belt to induct a first article therebetween, and to cause the first conveyor system to induct a first article onto the at least one conveyor belt in response to determining that sufficient room exists between the successive articles.

48. The apparatus of claim 47, wherein the at least one controller is configured to cause first articles to be inducted between successive articles such that, at least for articles of less than a certain length, at least a minimum gap is maintained between each inducted first article and each of the articles between which the inducted first article is inducted.

49. The apparatus of claim 37, further comprising at least one induction device configured and arranged to induct articles onto the at least one conveyor belt at a location upstream of the second position.

50. An apparatus, comprising:
at least one conveyor belt that moves articles along a first path extending in a first direction at least between first and second points;
a first conveyor system configured and arranged to move first articles along a second path that extends in a second direction, which is substantially perpendicular to the first direction, so that the first articles are positioned adjacent the first path at a first location between the first and second points, the first conveyor system being further configured and arranged to move the first articles onto the at least one conveyor belt after the first articles have been positioned adjacent the first path at the first location; and
a second conveyor system configured and arranged to move second articles alone a third path that extends in a third direction, which is substantially perpendicular to the first direction, so that the second articles are positioned adjacent the first path at a second location between the first and second points, the second location being upstream of the first location, the second conveyor system being further configured and arranged to move the second articles onto the at least one conveyor belt after the second articles have been positioned adjacent the first path at the second location.

51. The apparatus of claim 50, wherein the at least one conveyor belt comprises at least two parallel belts that carry articles along the first path.

52. The apparatus of claim 51, wherein the first conveyor system further comprises at least one roller disposed between the at least two parallel belts, the at least one roller being configured and arranged to move the first articles to a first position above but not in contact with the at least two parallel belts, and being further configured and arranged to be moved below an upper plane formed by the at least two parallel belts to thereby move the first articles onto the at least two parallel belts.

53. The apparatus of claim 50, wherein the first conveyor system comprises a plurality rollers configured and arranged to move the first articles so that the first articles are positioned adjacent the first path at the first location.

54. The apparatus of claim 50, wherein:
the first conveyor system comprises a first plurality of rollers configured and arranged to move the first articles along the second path so that the first articles are positioned adjacent the first path at the first location; and
the second conveyor system comprises a second plurality of rollers configured and arranged to move the second articles along the third path so that the second articles are positioned adjacent the first path at the second location.

55. The apparatus of claim 50, wherein the at least one conveyor belt is configured and arranged such that inducted articles are moved along the first path at a speed of at least 180 feet per minute.

56. The apparatus of claim 50, wherein the at least one conveyor belt is configured and arranged such that articles are caused to pass at least one point along the first path at a rate greater than 30 articles per minute.

57. The apparatus of claim 50, wherein the at least one conveyor belt is configured and arranged such that articles are caused to pass at least one point along the first path at a rate of at least 60 articles per minute.

58. The apparatus of claim 50, further comprising:
a third conveyor system configured and arranged to divert articles from the at least one conveyor belt at a third location that is upstream of the first location.

59. The apparatus of claim 50, further comprising at least one sensor and at least one controller, the at least one sensor being configured and arranged to monitor articles on the at least one conveyor belt, and the at least one controller being configured to monitor an output of the at least one sensor to determine whether sufficient room exists between successive articles on the at least one conveyor belt to induct a first article therebetween, and to cause the first conveyor system to induct a first article onto the at least one conveyor belt in response to determining that sufficient room exists between the successive articles.

60. The apparatus of claim 59, wherein the at least one controller is configured to cause first articles to be inducted between successive articles such that, at least for articles of less than a certain length, at least a minimum gap is maintained between each inducted first article and each of the articles between which the inducted first article is inducted.

61. The apparatus of claim 50, further comprising at least one induction device configured and arranged to induct articles onto the at least one conveyor belt at a third location that is upstream of the second location.

62. An apparatus, comprising:
a belt conveyor comprising at least two parallel belts that carry articles along a first path extending in a first direction at least between first and second points;
a first conveyor system configured and arranged to move first articles along a second path that extends in a second direction, which is transverse to the first direction, so that the first articles are positioned adjacent the first path at a first location between the first and second points, the first conveyor system being further configured and arranged to move the first articles onto the belt conveyor after the first articles have been positioned adjacent the first path at the first location; and
a second conveyor system configured and arranged to move second articles along a third path that extends in a third direction, which is transverse to the first direction, so that the second articles are positioned adjacent the first path at a second location between the first and second points, the second location being upstream of the first location, the second conveyor system being further configured and arranged to move the second articles onto the belt conveyor after the second articles have been positioned adjacent the first path at the second location.

63. The apparatus of claim 62, wherein the first conveyor system comprises at least one roller disposed between the at least two parallel belts, the at least one roller being configured and arranged to move the first articles to a position above but not in contact with the at least two parallel belts, and being further configured and arranged to be moved below an upper plane formed by the at least two parallel belts to thereby move the first articles onto the at least two parallel belts.

64. The apparatus of claim 62, wherein the first conveyor system comprises a first plurality of rollers configured and arranged to move the first articles along the second path so that the first articles are positioned adjacent the first path at the first location.

65. The apparatus of claim 62, wherein:
the first conveyor system comprises a first plurality of rollers configured and arranged to move the first articles along the second path so that the first articles are positioned adjacent the first path at the first location; and
the second conveyor system comprises a second plurality of rollers configured and arranged to move the second articles along the third path so that the second articles are positioned adjacent the first path at the second location.

66. The apparatus of claim 62, wherein the belt conveyor is configured and arranged to move articles along the first path at a speed of at least 180 feet per minute.

67. The apparatus of claim 62, wherein the belt conveyor is configured and arranged to move articles along the first path such that articles are caused to pass at least one point along the first path at a rate greater than 30 articles per minute.

68. The apparatus of claim 62, wherein the belt conveyor is configured and arranged to move articles along the first path such that articles are caused to pass at least one point along the first path at a rate of at least 60 articles per minute.

69. The apparatus of claim 62, further comprising:
a third conveyor system configured and arranged to divert articles from the belt conveyor at a third location that is upstream of the first location.

70. The apparatus of claim 62, wherein the apparatus further comprises at least one sensor and at least one controller, the at least one sensor being configured and arranged to monitor articles on the belt conveyor, and the at least one controller being configured to monitor an output of the at least one sensor to determine whether sufficient room exists between successive articles on the belt conveyor to induct a first article therebetween, and to cause the first conveyor system to induct a first article onto the belt conveyor in response to determining that sufficient room exists between the successive articles.

71. The apparatus of claim 70, wherein the at least one controller is configured to cause first articles to be inducted between successive articles such that, at least for articles of less than a certain length, at least a minimum gap is maintained between each inducted first article and each of the articles between which the inducted first article is inducted.

72. The apparatus of claim 62, further comprising at least one induction device configured and arranged to induct articles onto the belt conveyor at a third location that is upstream of the second location.

\* \* \* \* \*

UNITED STATES PATENT AND TRADEMARK OFFICE
CERTIFICATE OF CORRECTION

PATENT NO. : 6,907,978 B2
DATED : June 21, 2005
INVENTOR(S) : Evans et al.

It is certified that error appears in the above-identified patent and that said Letters Patent is hereby corrected as shown below:

Column 12,
Line 18, please change "alone" to -- along --.

Column 14,
Line 55, please change "alone" to -- along --.

Signed and Sealed this

Twenty-seventh Day of September, 2005

JON W. DUDAS
*Director of the United States Patent and Trademark Office*